J. C. JENKINS.
COTTON-SEED PLANTER.

No. 172,323. Patented Jan. 18, 1876.

Witnesses
Jno. S. Slater
J. P. Theodore Lang

Inventor
Joseph C. Jenkins
Mason Fenwick & Lawrence
Attys

UNITED STATES PATENT OFFICE.

JOSEPH C. JENKINS, OF LEBANON, TENNESSEE.

IMPROVEMENT IN COTTON-SEED PLANTERS.

Specification forming part of Letters Patent No. 172,323, dated January 18, 1876; application filed December 3, 1875.

*To all whom it may concern:*

Be it known that I, JOSEPH C. JENKINS, of Lebanon, in the county of Wilson, in the State of Tennessee, have invented a new and useful Improvement in Cotton-Seed Planters; and I do hereby declare the following to be a full, clear, and exact description of the same, reference being had to the accompanying drawings, forming part of this specification, in which—

Figure 1:
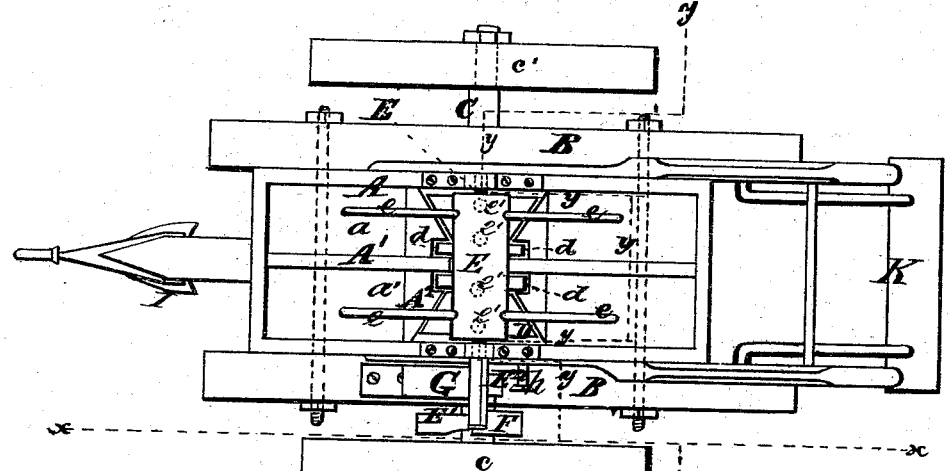
Figure 2:
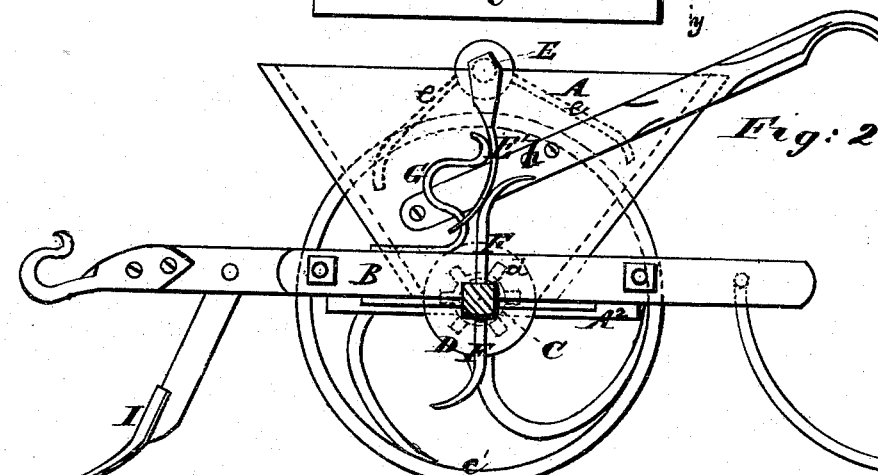
Figures 3, 4:
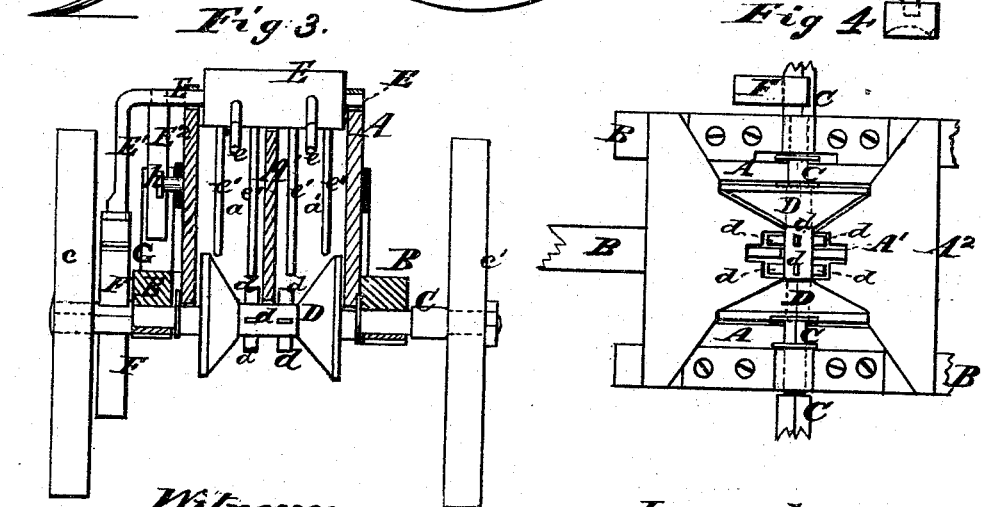

Figure 1 is a plan or top view of my improved cotton-seed planter. Fig. 2 is a longitudinal section on the line $x\ x$, Fig. 1, and Fig. 3 a transverse section on the line $y\ y$, Fig. 1, of the same. Fig. 4 is an inverted view of my improved machine.

My invention relates to that class of cotton-seed planters in which a toothed cylinder, in combination with a hopper, is used to drop the seed; and consists in the construction and arrangement of the various parts in such a manner as to secure the most satisfactory results with the least possible amount of machinery, and at small cost.

In order that others skilled in the art to which it pertains may be enabled to manufacture and use my improved machine, I more particularly describe it as follows:

In the drawings, similar letters of reference designate like parts of my invention; and A represents the hopper, divided longitudinally through its center, by the partition $A^1$, into two compartments, $a\ a'$, one of which is designed to hold the seed for planting, the other, guano or other fertilizing agent. This hopper A is mounted upon the frame B, the latter resting upon the revolving axle C, which carries the wheels $c\ c'$, one of which, $c'$, has no power of revolution independent of the axle. D is a cylinder, spool-shaped, supplied with teeth $d\ d$, and fastened upon the axle C at its center, so as to revolve with it. This cylinder is so arranged in relation to the bottom $A^2$ of the hopper as to be half its diameter above and half below the same; and in order to accommodate it to this location the bottom $A^2$ is cut away, so as to conform to the spool shape of the cylinder, and also permit the passage of its teeth as it revolves, as shown in Fig. 4. These teeth $d\ d$ are arranged in line with each other around the circumference of the cylinder D, there being a row on each side of the partition $A^1$, each row containing as many teeth as may seem desirable for the character of the planting required to be done.

If it is desired to construct a planter without the fertilizing attachment, this may be easily done by leaving out the partition $A^1$, and, instead of two rows of teeth, provide the cylinder D with but one row, making the bottom $A^2$ of the hopper conform thereto accordingly.

E is a shaft, extending transversely across the hopper, directly over and on the same line with the axle, and is provided with bent arms $e\ e$, the straight arms $e'\ e'$, the bent lever $E^1$, and the stop-lever $E^2$. The bent arms $e\ e$ are so arranged upon either side of their carrying-shaft as to scrape down the seed or fertilizing agent from the inclined front and rear ends of the hopper toward its central bottom by an alternating intermittent motion when the machine is in operation; and the straight arms $e'\ e'$ are arranged directly underneath the shaft E, and perpendicularly over the cylinder D, serving to keep the seed and fertilizing agent well stirred up, and thus prevent clogging of the cylinder, and at the same time insure the dropping of the seed, guano, or other substance. F is an S-shaped or double cam-lever, fixed crosswise upon the axle C, in such a manner as to bring one end of the cam-lever in contact with the end of the bent lever $E^1$ on the shaft E at every half-revolution of the axle, as shown in Fig. 2. The object of this arrangement is to keep the seed or other contents of the hopper stirred up by means of the motion thus communicated to the carrying-shaft of the arms $e\ e'$. G is a spring arranged upon the frame B, or side of the hopper A, at such convenient point in front of or over the axle as will permit its free end to rest against the lower end of the stop-lever H on the shaft E, and, by its pressure against said stop-lever H, applied in front, bring the shaft E back into its normal position, as shown in Fig. 2, so soon as the pressure of the double cam-lever F has been removed from the end of the bent lever $E^1$ by the revolution of the axle C. $h$ is a stud or stop placed in rear of the stop-lever H, to prevent its retracting too far as it is forced back by the spring G. I is a cultivator-tooth or plow, to prepare a furrow for the seed; and K is a drag or scraper attached to the rear end of the machine for the purposes of covering.

It may be observed that the mechanism necessary to operate the shaft E, which carries the arms $e\ e\ e'\ e'$, is placed at that end of the axle C which carries the fixed wheel $c'$. By thus arranging the parts, so long as the machine is traversing the furrow the dropping of the seed will be continued; but, when backing or turning at the end of a row, one end of the double cam-lever F interlocks with the end of the bent lever $E^1$, and all motion of the axle and dropping arrangement is thus suspended while the machine moves or turns upon the free wheel $c$, which revolves upon the axle C during the time the latter is held stationary, as above stated.

It is easily to be perceived that by this construction I have secured a cotton-seed planter the machinery necessary to the operation of which is quite simple and inexpensive, and the dropping movements of which are automatically suspended during the process of backing or turning, in the manner as already shown.

Having thus described my invention, what I claim, and desire to secure by Letters Patent, is—

1. In a cotton-seed planter, in combination with the downwardly-tapering hopper A and the seed-dropping cylinder D, the shaft E, provided with the bent arms $e\ e$, the arms $e'\ e'$, the lever $E^1$, and stop-lever $E^2$, substantially as described.

2. In combination with the vibrating shaft E, provided with the bent lever $E^1$ and the stop-lever $E^2$ of the shaft E, the spring G, and stop H, the cam-lever F on the axle C, which is provided with fast and loose wheels $c\ c'$, substantially as and for the purposes described.

JOSEPH C. JENKINS.

Witnesses:
   E. J. MIDDLETON, Jr.,
   J. S. SLATER.